(12) United States Patent
Iacovino et al.

(10) Patent No.: US 6,252,923 B1
(45) Date of Patent: Jun. 26, 2001

(54) IN-SITU SELF-POWERED MONITORING OF STORED SPENT NUCLEAR FUEL

(75) Inventors: John M. Iacovino, Murrysville; Thomas V. Congedo, Pittsburgh; William A. Byers, Murrysville; Abdul R. Dulloo, Pittsburgh; Frank H. Ruddy, Monroeville; David F. McLaughlin, Oakmont; Arnold H. Fero, New Kensington, all of PA (US); Brandon Damon Thomas, San Jose, CA (US); John G. Siedel, Pittsburgh, PA (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/371,720

(22) Filed: Aug. 10, 1999

(51) Int. Cl.[7] .................... G21C 17/06; G21C 17/07; G21C 17/108; G21C 17/112; G21C 19/06
(52) U.S. Cl. ................... 376/272; 376/247; 376/250; 376/254; 250/370.05; 250/370.06; 250/370.13
(58) Field of Search .................... 376/272, 257, 376/159, 254, 255, 247, 259; 250/370.05, 370.06, 370.13

(56) References Cited

U.S. PATENT DOCUMENTS

| | | |
|---|---|---|
| 3,227,876 | 1/1966 | Ross ................................ 250/83.1 |
| 3,805,078 | 4/1974 | Kozlov ............................... 250/390 |
| 3,832,668 | 8/1974 | Berman .......................... 338/22 SD |
| 4,267,454 | 5/1981 | Playfoot et al. .................... 250/370 |
| 4,284,893 | 8/1981 | Allan et al. ......................... 250/390 |
| 4,419,578 | 12/1983 | Kress ................................. 250/390 |
| 4,483,816 * | 11/1984 | Caldwell et al. ................... 376/158 |
| 4,687,622 * | 8/1987 | Longden ........................... 376/254 |
| 5,185,122 * | 2/1993 | Poppendiek et al. .............. 376/272 |
| 5,378,921 | 1/1995 | Ueda .................................. 257/574 |
| 5,898,747 * | 4/1999 | Singh ................................ 376/272 |
| 5,969,359 * | 10/1999 | Ruddy et al. ................... 250/370.05 |

FOREIGN PATENT DOCUMENTS

000524095A * 1/1993 (EP).

* cited by examiner

Primary Examiner—Charles T. Jordan
Assistant Examiner—Kyongtaek K. Mun

(57) ABSTRACT

Detectors are used to monitor the status of spent nuclear fuel storage containers non-invasively while they remain in storage casks. The detectors measure neutron flux and γ-ray flux and may also measure temperature variations of the spent nuclear fuel. The measurements can be accomplished actively or passively, with minimal exposure of individuals to radiation fields or other hazardous conditions. Preferred neutron and γ-ray detectors have a semiconductor active region that is resistant to neutron damage. Incipient structural failures may also be detected using measurements based on electrical continuity, with data being transmitted to an external pickup coil.

20 Claims, 6 Drawing Sheets

IN-SITU SELF-POWERED MONITORING OF STORED SPENT NUCLEAR FUEL

FIELD OF THE INVENTION

The present invention relates to monitoring of spent nuclear fuel, and more particularly relates to in-situ, self-powered monitoring of spent nuclear fuel stored in containers.

BACKGROUND INFORMATION

In the packaging of spent nuclear fuel from nuclear reactors for dry storage or shipment, the primary concern is with the reliable containment of the radioactive nuclear fuel in order to prevent unwanted exposure to radiation. To ensure this protection, the container or canister, and its associated surrounding cask, must meet several criteria. The container must provide containment integrity to prevent the release of radioactive material during normal or hypothetical accident conditions, as well as structural integrity in supporting the weight load of the contained fuel. Thermal protection is required to provide adequate dissipation of the decay heat produced by the spent nuclear fuel, to avoid compromising the integrity of the fuel or the materials of the container or cask. Adequate radiation shielding must also be provided to limit the radiation field external to the package to acceptable values. The container must also protect against the possibility of nuclear criticality, since the contained fuel could represent a critical mass if the system's engineered features were removed or sufficiently degraded, or if the fuel geometry were radically altered through structural degradation.

The containers are sealed upon loading, often by double welding, so that re-entry to perform measurements is often not an acceptable option. Instrumentation penetrations are generally regarded as unacceptable because of increased risk of confinement system failure. Because of the uniformity in the manufacture of such systems, monitoring may be performed on a statistically acceptable subset of containers for a given fuel type, to ensure safety of the entire population of containers.

Currently, only coarse methods of monitoring are available, for fuel in dry storage. In some metal cask systems, the performance of metallic O-rings is monitored, to ensure seal integrity. In concrete cask systems in which air flow occurs, periodic monitoring of air outlet temperature is conducted.

The present invention has been developed in view of the foregoing, and to overcome other deficiencies of the prior art.

SUMMARY OF THE INVENTION

The present invention provides a method and apparatus which allow remote monitoring of stored spent nuclear fuel, without breeching the containment boundary of the containers in which the spent nuclear fuel is stored. Detectors can be configured as an integral part of a spent fuel container, or as a measurement probe which can be placed adjacent the spent fuel container while it is contained within a storage cask. Monitoring of the neutron and γ-ray fields could be used to indicate the integrity of the fuel or neutron absorber, and the presence of water in the container. Temperature measurements may also be made to determine the temperature profile in the container. Structural degradation or failure of key components within the container may also be detected.

An object of the present invention is to provide a system for measuring neutron and γ-ray flux emitted from spent nuclear fuel including a container, spent nuclear fuel in the container, and at least one detector positioned to receive the neutron and γ-ray flux from the spent nuclear fuel. Multiple such "neutron and γ-ray" detectors are preferably positioned in an array either inside or outside the container. The neutron and γ-ray detectors preferably include a semiconductor active region comprising silicon carbide or metal. A cask made of concrete or metal may be placed around the container and detectors to provide shielding, support, and impact protection.

Another object of the present invention is to provide a method of measuring neutron and γ-ray flux from spent nuclear fuel, the method comprising the steps of placing spent nuclear fuel in a container, sealing the container, and measuring neutron and γ-ray flux from the spent nuclear fuel with at least one neutron and γ-ray detector. The detector may be sealed inside the container or positioned on the exterior of the container.

Another object of the present invention is to provide a method and apparatus for measuring the temperature of spent nuclear fuel in a container.

Another object of the present invention is to provide a method and apparatus for sensing the structural integrity of key components of containers for spent nuclear fuel.

These and other objects of the present invention will be more apparent from the following description.

DETAILED DESCRIPTION OF THE PREFERRED EMBODIMENTS

Figure 1:
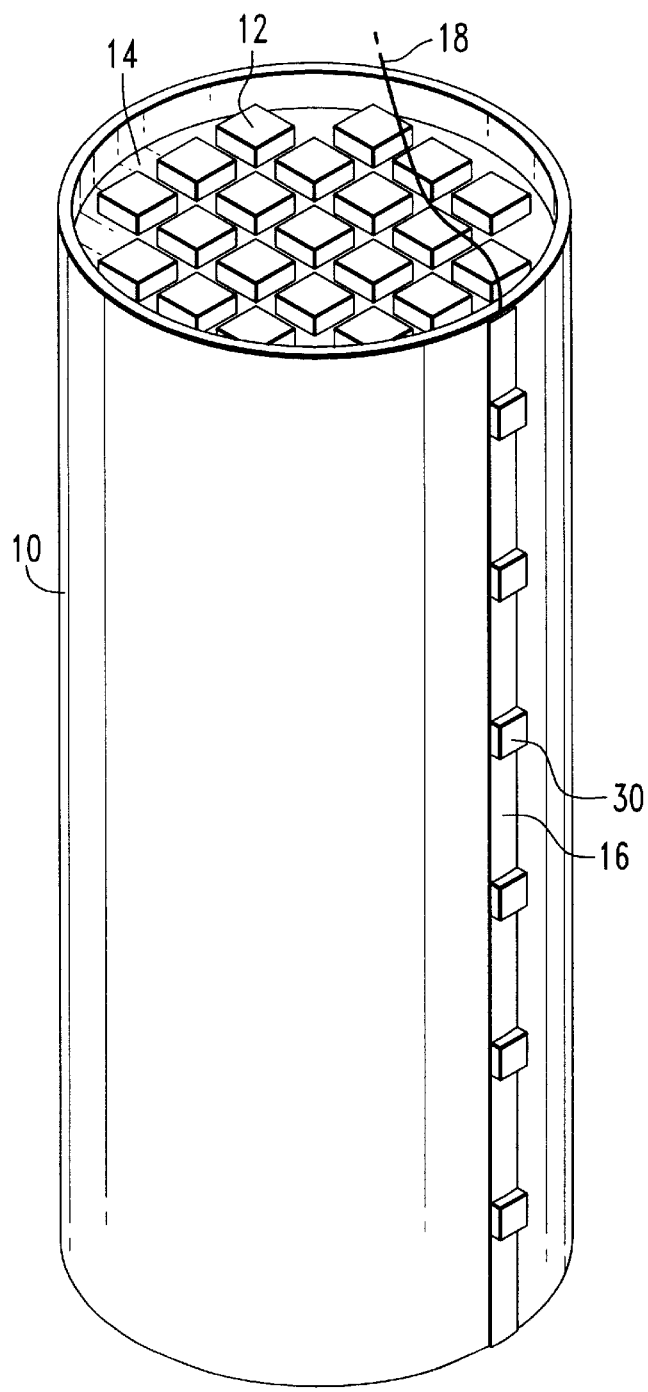
FIG. 1 is a side perspective view of spent nuclear fuel assemblies positioned inside a container, including an array of detectors for simultaneously measuring neutron and γ-ray flux in accordance with the present invention.
Figure 2:
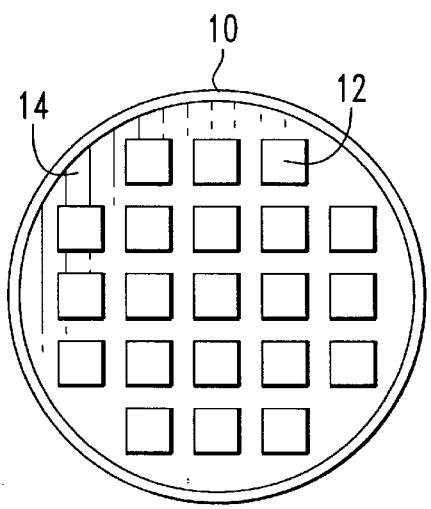
FIG. 2 is a top view of the spent nuclear fuel assemblies and container of FIG. 1.

FIG. 1 is an isometric view and FIG. 2 is a top view of a spent nuclear fuel container 10 having multiple spent nuclear fuel assemblies 12 stored therein. The fuel assemblies 12 extend substantially the entire axial length of the container 10. A neutron absorbing material 14, such as boral neutron poison or borated stainless steel, is located around the spent nuclear fuel assemblies 12 within the container 10. The container 10 may be of any desired size and, for example, typically has a length of about 190 inches and an outer diameter of about 66 inches, with a capacity for twenty-one to twenty-four pressurized water reactor spent nuclear fuel assemblies of forty-four to seventy-four boiling water reactor spent nuclear fuel assemblies 12. The spent fuel assemblies 12 may be from a pressurized water reactor (PWR) or a boiling water reactor (BWR). A circular lid (not shown) is typically double welded or otherwise multiply sealed to the top of the container 10 in a known manner to seal the container after the spent fuel assemblies have been loaded.

As shown in FIG. 1, in one embodiment an array of detectors 30 is placed adjacent the container 10. In accordance with the preferred embodiment of the present invention, the detectors 30 are used to simultaneously measure neutron and γ-ray flux, as more fully described below. In an alternative embodiment, temperature sensors may be used in addition to the neutron and γ-ray detectors 30 to measure a temperature profile of the container 10. The neutron detectors 30 may be mounted on a strip 16 or other suitable support structure that allows placement of the detectors 30 adjacent or within the canister 10 in the desired locations. The strip 16 includes wires or other suitable electrical conductors for transmitting signals generated by the neutron detectors 30. A wire 18 or other suitable conductor transmits the signals from the strip 16. The strip 16 preferably comprises a flexible material such as an insulating plastic resistant to high temperatures and radiation, which facilitates placement of the arrays 30 adjacent the container 10. The neutron and γ-ray detectors and the (optional) thermal sensors might alternatively be located inside the container.

Figure 3:
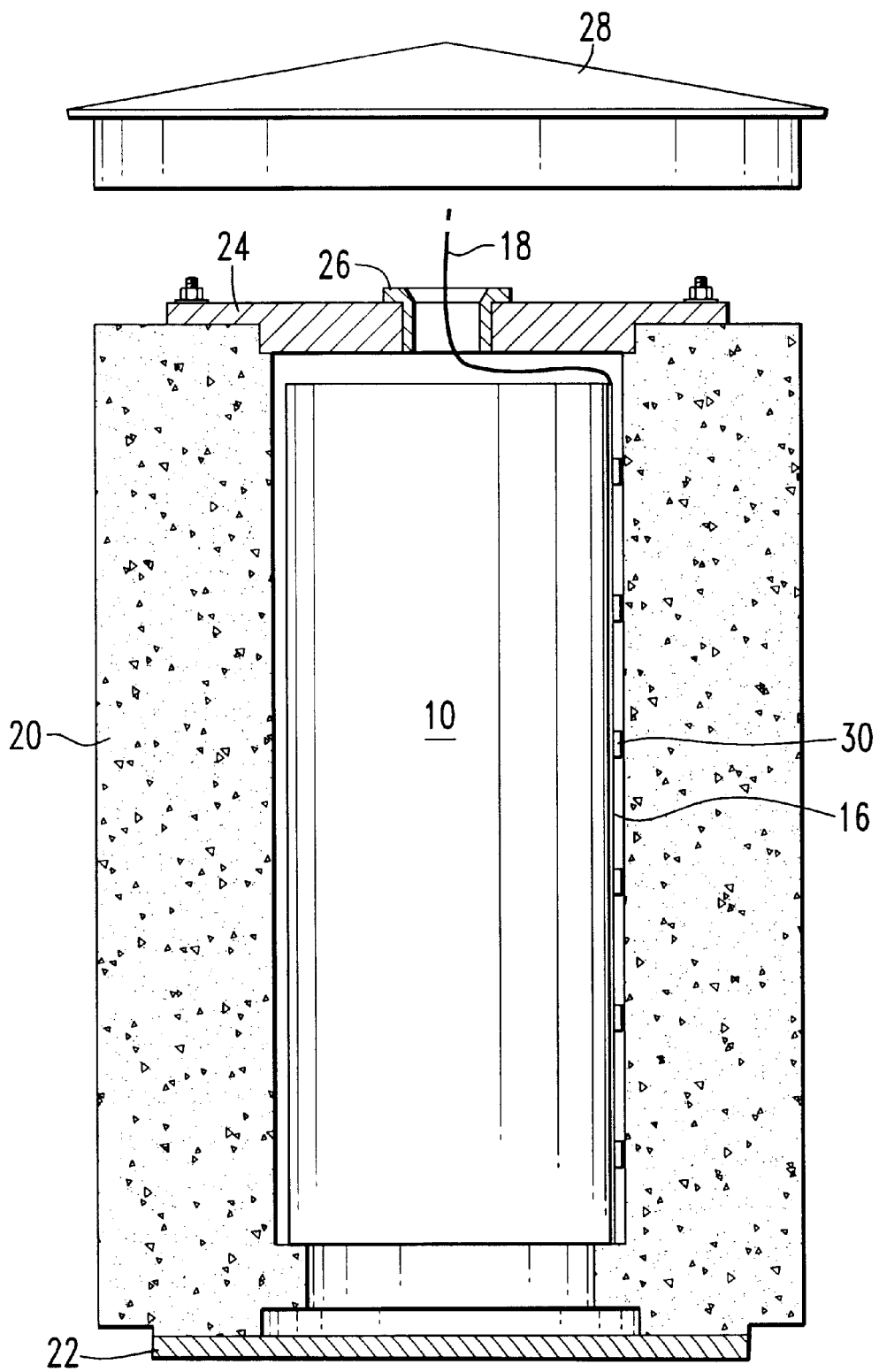
FIG. 3 is a side sectional view of a spent nuclear fuel container positioned inside a typical storage cask, including one embodiment of an array of neutron and γ-ray detectors in accordance with the present invention.

As shown in FIG. 3, the sealed spent nuclear fuel container 10 may be stored inside a concrete cask 20 having a base 22 and lid 24. The base 22 and lid 24 surround and contain the cask 20 according to the specific manufacturer's design. In one example shown, a ventilation opening 26 is provided in the lid 24. A cover assembly 28 is placed over the lid 24 and rests on the cask 20. The area between the inner wall of the cask 20 and outer wall of the container 10 defines an annular region in which the neutrons and γ-ray detectors 30 are positioned. In a preferred design, a thin steel annular heat shield may be used between the canister and cask. The neutron and γ-ray detectors 30 are held in the desired location in relation to the container 10 by the strip 16. In a preferred embodiment, the wire 18 extends through the ventilation opening or another suitable penetration 26 to the exterior of the cask 20 in order to transmit the signals generated by the neutron and γ-ray detectors 30.

In accordance with the present invention, the neutron and γ-ray detectors 30 are used to monitor the flux of energetic neutrons and γ-ray emitted by the spent nuclear fuel assemblies 12. The detector array may be periodically interrogated, such as once every few months. By performing this interrogation when the spent nuclear fuel container 10 is put into storage, a baseline profile of neutron flux and γ-ray flux versus container height is established. Subsequent variations from this profile can be used to determine several parameters of interest.

For example, if an unforeseen event were to introduce water into the container, some neutron absorbing materials 14, e.g., boral neutron poison, which typically extends within the container 10 over the entire length of the fuel assemblies 12, might decompose over a period of decades as a result of corrosive processes. If the geometry of the neutron absorbing material 14 were to alter, for example, by dropping to a lower height, the neutron profile would reflect this circumstance. In the region of height from which the neutron absorber 14 has been removed, the detectors 30 would report locally higher neutron flux and γ-ray flux, due to locally greater neutron multiplication, due to fission and the overall neutron flux would rise somewhat due to neutron leakage from this region.

As another example, water incursion into the container 10 would produce a region of locally greater neutron flux and γ-ray flux due to an increase in the fission reaction rate at the bottom of the spent fuel assembly region, which would lead to a skewing of the neutron and γ-ray flux profiles toward the bottom and a slight overall increase in neutron flux due to neutron leakage from the bottom region. If water incursion is suspected, confirmation may be obtained by deploying a passive gamma spectrometer which would record the presence of the 2223 keV prompt gamma ray produced by the capture of thermal neutrons in hydrogen. This measurement would preferably be made in a configuration which isolates the spectrometer from 2223 keV gamma rays generated in other hydrogenous material, or in which there is sufficiently little other hydrogenous material that a foreground-background measurement approach can be taken.

Alteration of the neutron absorbing material 14 or incursion of water into the container 10 may thus be detected in a timely fashion in accordance with the present invention. This allows the timely monitoring of other containers to determine the need for any possible fuel reloading.

In one embodiment, if storage conditions allow retrieval of sensors, the monitoring of the fuel neutron field can be achieved by providing small wells in the inner wall of the surrounding cask, into which are placed passive, interrogable monitors such as a conventional Solid State Track Recorder (SSTR) neutron dosimeter. Alternatively, a string of such sensors can be deployed from the cask opening beneath the rain cover or other suitable penetration, using a flexible holder which can be fastened to the steel container outer wall or other suitable surface. Proper placement can be assured by aligning the holder with fiduciary marks. In this way, the neutron field sensors could be retrieved for readout and replaced as desired.

In a preferred embodiment, the array of neutron and γ-ray detectors 30 comprises a set of semiconductor detectors which have been specially configured to be both neutron and γ-ray -sensitive. Such an array may be configured to provide a low volume probe suitable for deployment within the region between the container outer radius and the inner radius of a concrete storage cask, as shown in FIG. 3. The sensor strip 16 can be deployed by various means such as passing the strip through the ventilation opening 26 or other suitable penetration into the annular space between the container 10 and cask 20. Similar deployment is possible for storage in a horizontal orientation.

In another embodiment, because the preferred semiconductor neutron and γ-ray detectors 30 are radiation hard, can function in high temperature environments and could be configured to function without application of an external bias voltage, they may be loaded into the container 10 prior to sealing, without requiring external electrical connections. By using the detector 30 as a variable current source component of a low-frequency LRC circuit, the signal may be detected remotely using a pickup loop having a frequency varied to match the LRC output.

In such a circuit containing the inductance L (henry), capacitance C (farad) and resistance R (ohm), the oscillation frequency ν is given by the formula:

$$\nu = (1/2\pi) \times \sqrt{(1/LC) - (R/2L)^2}.$$

The signal may then be picked up remotely using a pickup coil whose frequency is scanned to match the oscillation frequency. For frequencies less than or on the order of about 20 Hz, satisfactory transmission of the signal through a container wall of roughly one inch thickness of Type 304 or a similar stainless steel may be achieved. At 20° C. the resistivity of copper is about 1.7 $\mu\Omega$-cm and that of iron is about 9.7 $\mu\Omega$-cm. Copper exhibits a skin depth for attenuation of electromagnetic signals of 0.85 cm for a signal of 60 Hz frequency. The skin depth (representing attenuation of an incident signal by the factor 1/e) varies according to the formula:

$$\delta = c/\sqrt{(2\pi\mu\omega\sigma)};$$

wherein $\delta$=skin depth (cm); c=speed of light ($3.0 \times 10^{10}$ cm/sec); $\mu$=magnetic permeability of the attenuating medium; $\omega$=electromagnetic oscillation angular frequency (radian/sec); and $\sigma$=electrical conductivity of the attenuating medium $(\Omega\text{-cm})^{-1}$. At 60 Hz iron is expected to exhibit a skin depth of about 2.1 cm (0.8 inch), while at 20 Hz this depth would be of the order of about 3.6 cm (1.4 inch). Thus, the skin depth in stainless steel for a 20 Hz signal is on the order of one inch or greater, and satisfactory transmission through the container wall can be achieved.

Alternatively, the circuit may be coupled to a generator of acoustic signals in the Mhz frequency range to achieve satisfactory signal penetration through the container wall. The attenuation of a 2 Mhz acoustic signal in worked steel is less than 10 dB/meter. For a thickness of one inch, only a few percent of the intensity of a 2 Mhz acoustic signal would be expected to be lost during transmission, which is satisfactory.

If electrical power is required to power the detectors within the container, it may be supplied by a thermoelectric generating device within the container which utilizes a small portion of the thermal heat output from the fuel. For example, 10-year cooled PWR fuel of typical burnup of 40,000 MWD/MTU has a heat output of roughly one kilowatt per assembly, whereas thermoelectric generators with a 50 watt heat source can produce 3 watts of electric power.

Thus, in accordance with the present invention, neutron and γ-ray field sensing may be achieved either through the application of passive or active sensors external to the surface of the container 10, or through the placement of sensors within the container.

The preferred semiconductor neutron and γ-ray detectors 30 of the present invention preferably comprise a neutron converter layer and a semiconductor active region which is designed to avoid radiation damage to the semiconductor material. Deterioration of prior art solid state radiation detectors caused by damage by energetic particles is a well known phenomenon. The accumulation of radiation damage in the semiconductor material leads to increased leakage current and decreased charge collection efficiency. This radiation damage is caused by the displacement of atoms in the semiconductor by the energetic charged particles. Over time, this damage causes substantial deterioration of detector performance.

As a charged particle loses energy in a material, it creates both electron excitation events and displaced atoms. The energy loss can be described by the Bragg curve. The neutron detector of the present invention takes advantage of the change in the partitioning between electronic excitation and displacement events along the range of the charged particle. For high energy alpha particles ($^4$He ions), electron excitation is the predominant energy loss mechanism. As the particle loses energy, the importance of displacement damage increases. Most of the displacement damage therefore occurs near the end of the range of travel of the charged particles.

In the preferred semiconductor neutron detectors 30, the type of neutron converter layer, the type of semiconductor material, and the thickness and placement of the semiconductor active region are preferably controlled to allow the charged particles to pass through the active semiconductor region without substantial displacement damage. The semiconductor active region is sufficiently thin to avoid displacement damage, but is thick enough to allow sufficient ionization or electron excitation to create a measurable electronic pulse. The relatively thin semiconductor detector is substantially less susceptible to radiation damage than conventional detectors.

Figure 4:
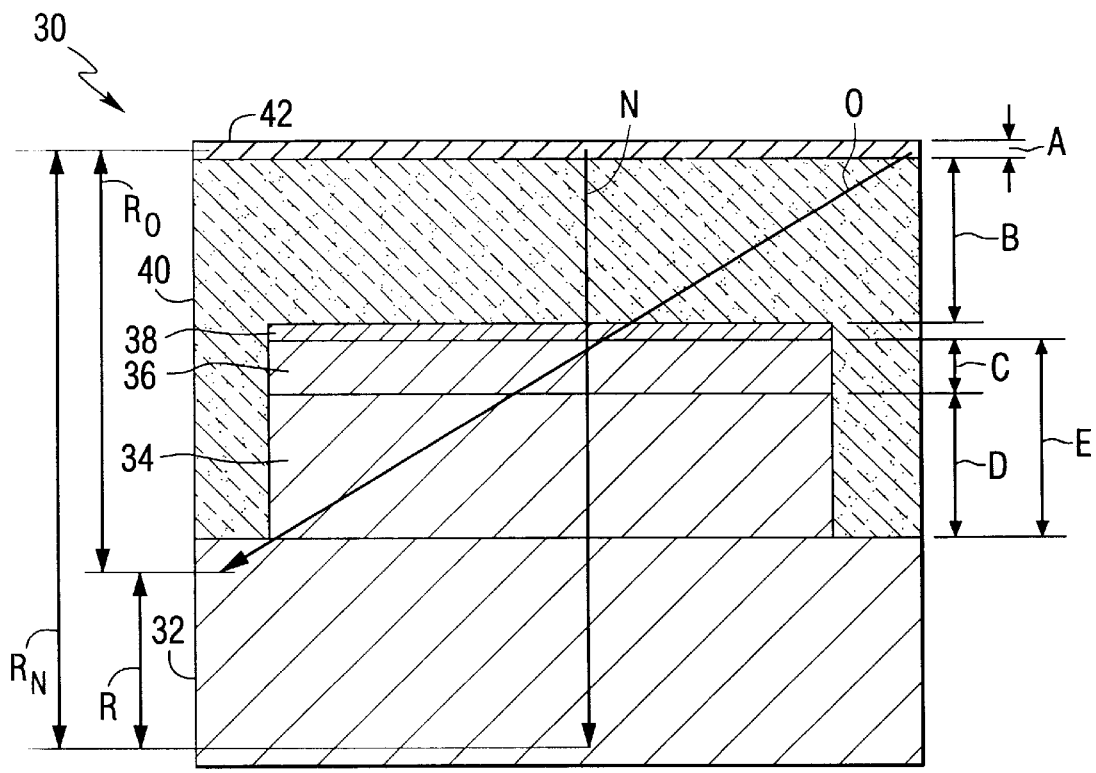
FIG. 4 is a partially schematic side sectional view of a semiconductor neutron detector in accordance with an embodiment of the present invention.

FIG. 4 schematically illustrates a neutron detector which may be used individually or in an array in accordance with the present invention. FIG. 4 is not drawn to scale for purposes of illustration. The neutron detector 30 preferably includes a substrate 32 made of a semiconductor material such as SiC, GaAs, CdTe, diamond, Ge, Si or other appropriate material. The substrate 32 preferably has a thickness of about 100 to 1000 microns. For high temperature operations, the substrate 32 is preferably made of temperature resistant materials such as SiC, diamond, silicon nitride, gallium nitride and indium nitride. Where SiC is used as the substrate 32 it may be doped with sufficient amounts of nitrogen or other appropriate impurities to provide sufficient conductivity. The substrate 32 may be formed by processes such as high-purity crystal growth or chemical vapor deposition.

In the embodiment shown in FIG. 4, a semiconductor P-N junction is formed by an N-type semiconductor layer 34 and a P-type semiconductor layer 36. The N-type and P-type semiconductor layers 34 and 36 define the semiconductor active region of the neutron detector 30. Silicon and germanium are suitable semiconductor materials. However, for high temperature operations, the semiconductor active region 34, 36 is preferably made of materials capable of operating at elevated temperatures, such as SiC, diamond, GaAs, GaP, PbO and CdS. Where SiC is used as the N-type and P-type layers, such layers are preferably formed by chemical vapor deposition of layers containing an appropriate amount of impurity atoms to increase conductivity. For example, when nitrogen is the dopant, typical concentrations in the N- and P-type layers are about $10^{15}$ and greater than about $10^{19}$ atoms per cm$^3$, respectively.

While the active region shown in FIG. 4 comprises a P-N junction, other types of solid state active regions may be used such as Schottky diodes, diffused junction devices, ion implanted diodes or surface barrier detectors. For example, a Schottky diode may be placed adjacent to a neutron converter layer comprising boron, lithium, uranium or other suitable material. The neutron converter material may optionally serve as the metal rectifying Schottky contact. Alternatively, a Schottky diode may be used comprising a contact metal layer of Au, Ni or Pt, an n− layer of SiC, an n+ layer of SiC, and a conductive SiC substrate.

In the embodiment of FIG. 4, electrical contacts are made to the semiconductor active region 34, 36 by means of the conductive substrate 32 and a thin conductive contact 38. Conventional electrical connections may be made to the substrate 32 and the contact 38 to receive electronic signals from the semiconductor active region 34, 36 during operation of the detector. The contact 38 preferably has a thickness of from about 0.075 to 1 micron, and is made of any suitable material such as gold, platinum, aluminum, titanium or nickel.

An optional insulating material 40 may be provided around at least a portion of the semiconductor active region 34, 36 in order to protect the active region from mechanical stresses and/or chemical attack. The insulating material 40 may also be used to space the semiconductor active region 34, 36 a desired distance from a neutron converter layer 42, as more fully described below. The insulating material 40 may comprise any suitable material such as oxides, nitrides and phosphides. For high temperature operations, oxides such as $SiO_2$ are particularly suitable. The $SiO_2$ layer may be formed by methods such as chemical vapor deposition.

The semiconductor detector 30 includes a neutron converter layer 42 which generates charged particles when the layer is impinged by neutrons. The neutron converter layer may comprise a relatively thin film or coating, or may comprise a doped region of the device. The composition of the neutron converter layer 42 is selected such that upon impingement by neutrons, charged particles such as $^1H$, $^3H$, $^7Li$ and $^4He$ ions are generated. Species capable of generating such charged particles include $^6Li$, $^{10}B$, H, and $^3He$. Alternatively, fissionable materials such as $^{235}U$, $^{233}U$ or $^{239}PU$ can be used to produced charged particles in the form of energetic fission fragments. In particular, $^{238}U$ and $^{237}Np$, where fission cross sections exhibit threshold energies of 0.1 to 1.0 MeV, would be expected to provide the most faithful axial profile of the fuel neutron source, since they are insensitive to neutrons which have undergone downscattering in the surrounding materials. Although their fission cross sections are only on the order of 0.1 b to 1b, the long periods of data collection associated with the present application would be expected to render them suitable for this purpose.

The size of the semiconductor active region 34, 36 and its placement in relation to the neutron converter layer 42 are preferably controlled in order to minimize radiation damage. As shown in FIG. 4, the neutron converter layer 42 is relatively thin, having a thickness A preferably ranging from about 0.1 to about 10 microns. The optional insulating material 40 has a thickness B which is selected in order to minimize displacement damage caused by charged particles, as more fully described below. The thickness B of the insulating material 40 typically ranges from 0 to 10 microns or more. The P-type semiconductor layer 36 has a thickness C, while the N-type semiconductor layer 34 has a thickness D. The thickness C preferably ranges from about 0.1 to about 5 microns, while the thickness D preferably ranges from about 1 to about 10 microns. The semiconductor active region, which is defined by the N-type and P-type layers 34 and 36, has a thickness E. The thickness E preferably ranges from about 1 to about 15 microns, and is selected such that dislocation damage caused by charged particles is minimized.

As shown in FIG. 4, upon impingement by neutrons, some charged particles exit the neutron converter layer 42 in a normal direction N. As more fully described below, a charged particle traveling along direction N will cause electron excitation events as it travels, and will eventually come to rest a distance $R_N$ from the neutron converter layer 42. The semiconductor active region 34, 36 having the thickness E is positioned in relation to the neutron converter layer 42 such that the charged particles traveling in the direction N cause ionization within the thickness of the semiconductor active region E, and pass through the active region before they come to rest. In this manner, dislocation damage within the active region is minimized.

As shown in FIG. 4, charged particles exiting the neutron converter layer 42 will also travel at non-normal angles, such as in the oblique direction O. Charged particles traveling along direction O pass through the semiconductor active region 34, 36 and come to rest a distance $R_o$ from the neutron converter layer 42. The charged particles thus pass through the semiconductor active region 34, 36 in many different directions ranging from normal angles N to relatively shallow oblique angles O. The range of the charged particles is defined by a band R which is located away from the neutron converter layer a minimum distance of $R_o$ and a maximum distance of $R_N$. As schematically shown in FIG. 4, the range of the charged particles falls in a band R outside of the semiconductor active region 34, 36. Instead of causing dislocation damage within the active region, the charged particles come to rest in the substrate 32.

Figure 5:
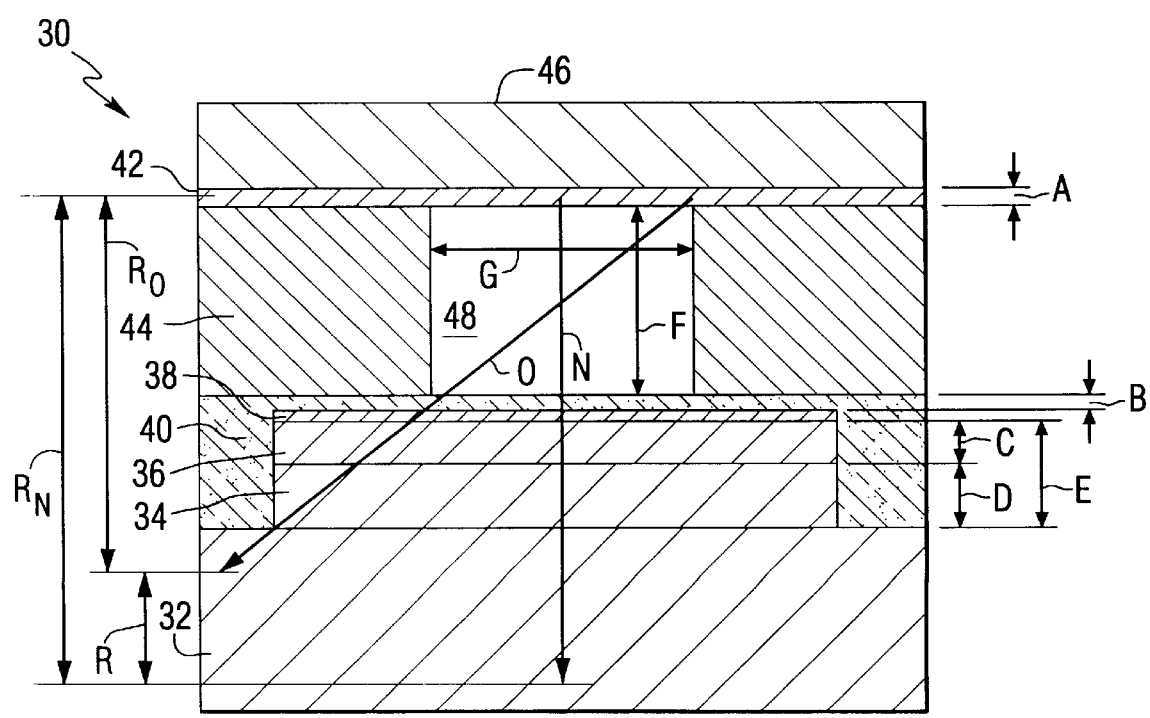
FIG. 5 is a partially schematic side sectional view of a semiconductor neutron detector in accordance with another embodiment of the present invention.

FIG. 5 schematically illustrates a semiconductor detector 30 suitable for use in accordance with another embodiment of the present invention. The detector 30 of FIG. 5 likewise includes a substrate 32 having an N-type semiconductor layer 34 and P-type semiconductor layer 36 disposed thereon. An electrical contact 38 and optional insulating material 40 are also incorporated in the detector of FIG. 5. A collimator 44 is positioned between the active region 34, 36 and the neutron converter layer 42. The collimator 44 may be made of any suitable ion absorbing material such as $SiO_2$, SiC or silicon nitride. The collimator 44 includes an inner passage 48 having a length F and a width G. The inner passage may comprise a gas such as air, nitrogen or helium. A cap 46 made of any suitable material such as aluminum or nickel provides support for the neutron converter layer 42. The collimator 44 is used to reduce the number of charged particles which enter the semiconductor active region 34, 36 at shallow angles. The height F of the inner passage 48 is preferably at least twice the width G of the passage. Charged particles exiting the neutron converter layer 42 at highly oblique angles are absorbed by the walls of the collimator 44 and do not pass into the active region 34, 36.

As shown in FIG. 5, charged particles traveling in a normal direction N come to rest a distance $R_N$ from the neutron converter layer 42. Charged particles traveling in an oblique direction O come to rest a distance $R_o$ away from the neutron converter layer 42. The range of the charged particles is defined by a band R which is located a minimum distance $R_o$ from the neutron converter layer 42 and a maximum distance $R_N$ from the neutron converter layer. By increasing the ratio of the height F to width G of the inner passage 48, the maximum angle between the normal direction N and oblique direction O is decreased, thereby decreasing the width of the band R.

Figure 6:
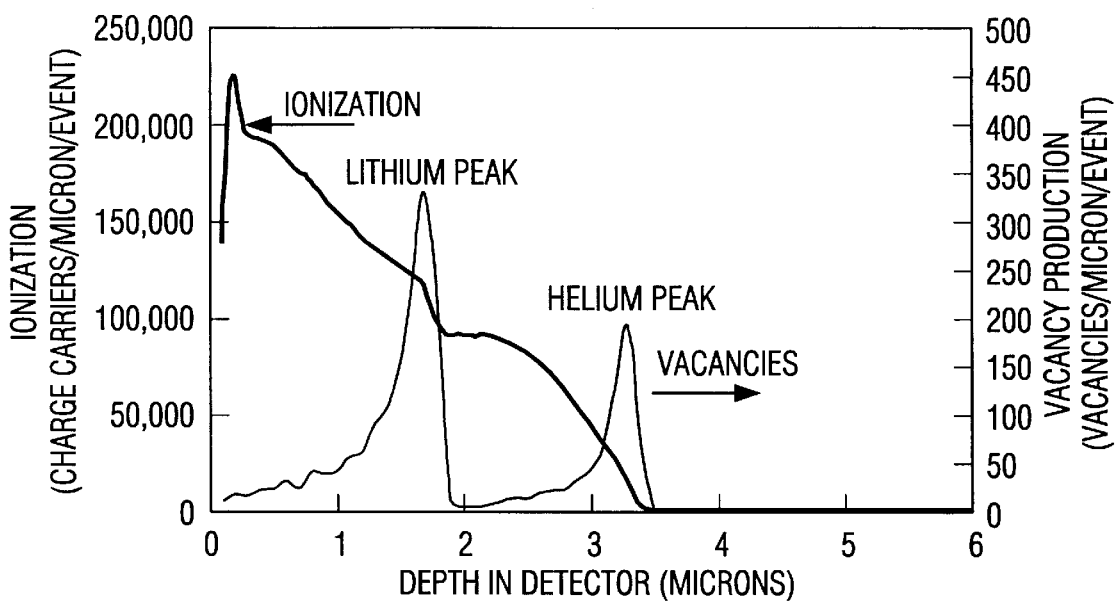
FIGS. 6–9 are graphs of detector depth versus ionization and vacancy production representing energy dissipation curves for various silicon carbide neutron detectors of the present invention.

Energy deposition curves for charged particles in the detector material may be used to determine the appropriate thickness of the semiconductor active region. Such energy deposition curves may be established from the TRIM computer code developed by Biersack and Ziegler, or other conventional rangeenergy calculation methods. The distribution curves for ionization and vacancy production by a normally incident beam of $^{10}$B reaction products in SiC is illustrated in FIG. 6. The reaction products comprise charged particles of Li and He ions. Due to its relatively high atomic number (Z), the range of the Li ion is relatively short, i.e., about 1.75 microns. The range of the He ion is nearly double the Li ion range. The displacement damage caused by each type of ion occurs near the end of the range. As shown in FIG. 6, in the first micron, the energy loss to ionization is relatively high and only minimal displacement damage occurs. At about 1.6 microns displacement damage caused by Li ions reaches a peak. After about 1.8 microns ionization energy loss again dominates displacement damage. However, at about 3.3 microns dislocation damage caused by He ions reaches a peak. In order to avoid dislocation damage, the semiconductor active region is positioned in a region where ionization energy loss is high and displacement damage is low. Thus, for a normally incident beam of reaction products, the SiC active region may be positioned at a distance of less than about 1.5 microns from the boron neutron converted layer and/or at a distance between about 1.8 and 3.1 microns from the neutron converter layer.

Figure 7:
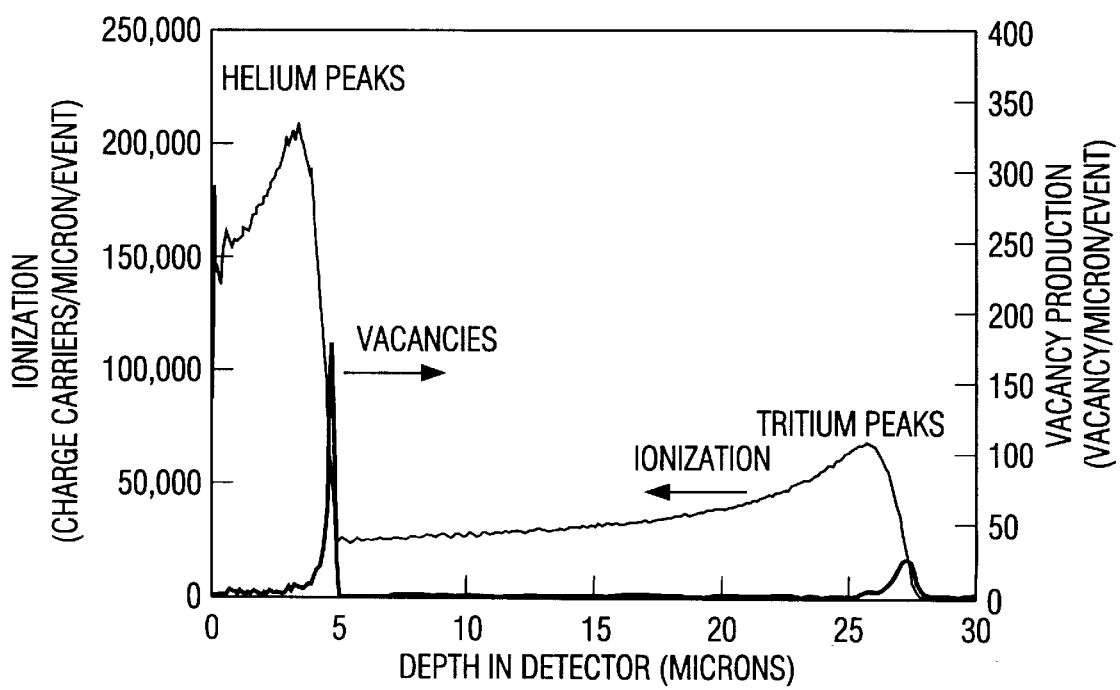

FIG. 7 illustrates energy loss curves for a normally incident beam of $^6$Li reaction products in SiC. The reaction products comprise charged particles of $^4$He and $^3$H (tritium) ions. In comparison with the $^{10}$B reaction products shown in FIG. 6, the near surface low damage zone is larger for the lower Z, higher energy products of the $^6$Li reaction. As shown in FIG. 7, the He ions are the higher Z products with a shorter range of about 4.5 or 5 microns. The H ions have a longer range of about 27 microns. For the lithium reaction products, the low damage region extends over approximately the first 4 microns of the detector. At about 5 microns, dislocation damage caused by He ions reaches a peak, but quickly subsides thereafter. From about 5 microns to about 27 microns, ionization energy loss is again maximized. However, at about 27 microns dislocation damage caused by H ions reaches a peak. Thus, for a normally incident beam of reaction products, the SiC semiconductor active region should therefore be located at a distance of less than about 4 microns from the lithium neutron converter layer and/or at a distance between about 5 and 27 microns from the neutron converter layer.

Figure 8:
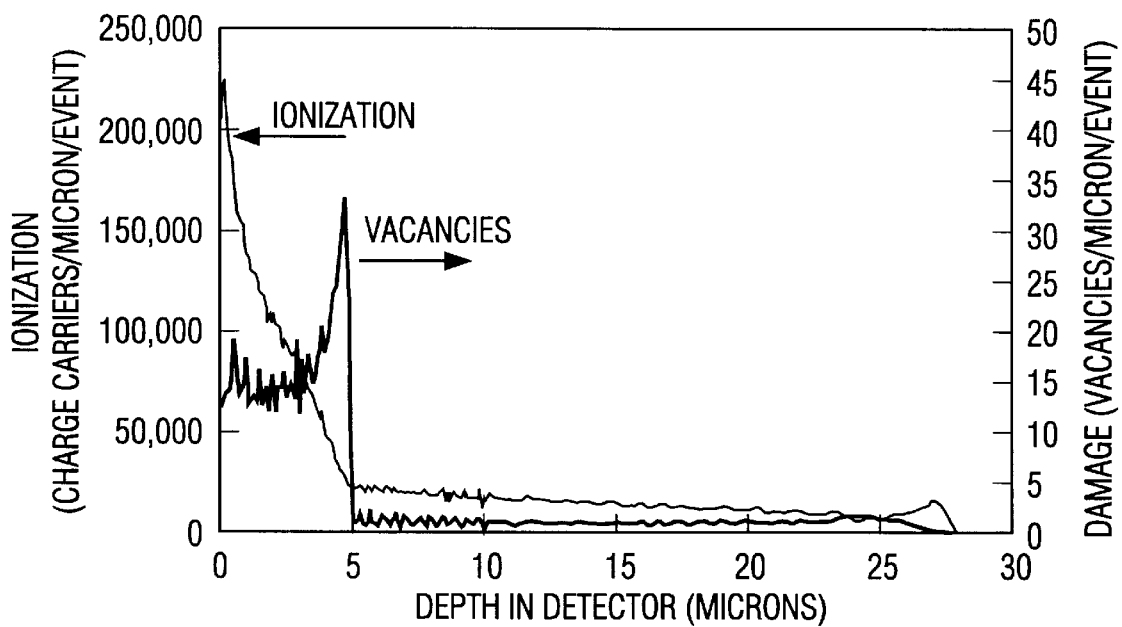

The semiconductor neutron detector is preferably provided with an active zone that corresponds to a region with a high ratio of ionization energy loss to displacement damage production. The spacing between the neutron convertor layer and the active region of the detector is preferably controlled depending on the incident radiation. For a normally incident beam, the neutron convertor layer may advantageously be placed adjacent to the semiconductor active region. However, the angular distribution of reaction product ions exiting the neutron convertor layer is usually random. This leads to a broadening of the energy dissipation curves as illustrated in FIG. 8 for the $^6$Li reaction. For this broadened curve, with SiC as the semiconductor active region, the maximum ionization to displacement ratio occurs between about 5 and 15 microns. Thus, the SiC active region is preferably about 5 to 10 microns thick and is spaced about 5 microns from the neutron converter layer. The semiconductor active region is thereby positioned away from the neutron converter layer in a location where the ratio of ionization energy loss to displacement damage is maximized.

Figure 9:
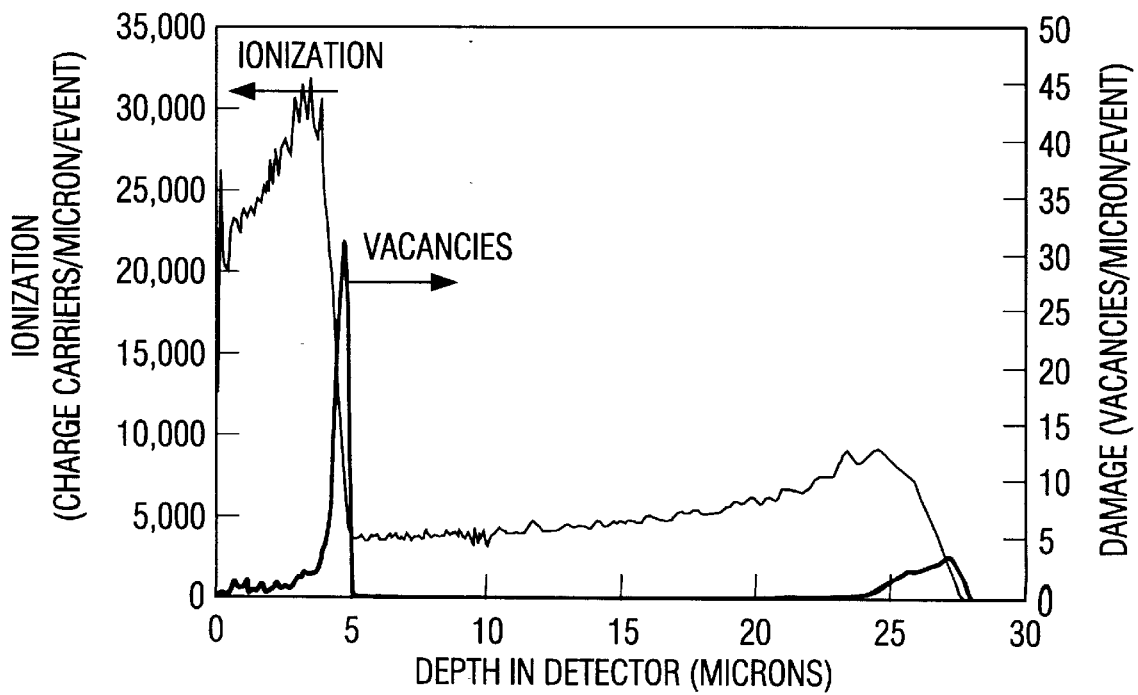

An energy dissipation curve for a collimated beam with Li as the neutron converter layer and SiC as the semiconductor active region is shown in FIG. 9. Although slight broadening of the damage peak is noted, the number of vacancies produced in the first 3.5 microns of the detector approximates the levels obtained from a normally incident beam, as shown in FIG. 7. While the use of a collimator may reduce the overall signal of the device by eliminating a proportion of the incident radiation, compensation for this signal loss may be provided by increasing the concentration of Li in the neutron convertor layer. Alternatively, microchannelling devices may be used to eliminate shallow incident angles. However, the increased collimation provided by such devices may not be sufficient to justify the resultant decrease in signal intensity.

The preferred neutron detectors for use in accordance with the present invention possess several advantages over conventional designs. The use of a relatively thin semiconductor active region substantially reduces radiation damage. The use of a thin semiconductor active region also provides for gamma discrimination because the active thickness of the detector may be less than the range of most gamma radiation. This allows the detectors to measure neutron flux in the presence of large gamma fields. Furthermore, the use of high temperature resistant materials such as silicon carbide in the active region of the detector permits extended use in elevated temperature environments associated with spent nuclear fuel.

The following examples are intended to illustrate various aspects of the present invention and are not intended to limit the scope thereof.

Multiple detectors may be formed into an array or string for in-situ measurement of neutron flux and γ-ray flux from spent nuclear fuel, as shown in FIGS. 1–3 and discussed previously.

In a manner similar to that described above for the measurement of the spatial profile of neutron flux and γ-ray flux, an axial array of thermocouples or other temperature sensors can be used to measure the axial profile of temperature within the container 10. The container 10 is typically sealed and back-filled with helium to a pressure of a few lbs/in$^2$ gauge. If the helium backfill were to degrade, a significant loss of ability to dissipate heat to the outside could result. Further, the helium leak could also be indicative of significant canister leakage. Measurements taken at regular intervals such as weeks or months may indicate this degradation through a gradual, relatively uniform change in measured temperatures. On the other hand, if a significant alteration of fuel assembly 12 or absorbing material 14 geometry occurs within the container 10, a skewed temperature profile could result. This profile would correlate with skewed neutron flux and γ-ray flux profiles to indicate a possible need for further attention.

Conventional thermocouples may serve as temperature sensors in a flexible sensor holder applied externally to the container 10 within the concrete storage cask 20, as described above for neutron measurements. Thus, temperature sensors may be used in addition to the neutron detectors shown in FIG. 3. While thermocouples may require active interrogation, the thermal sensor may instead comprise a conventional passive Integrating Thermal Monitor (ITM). Like the SSTR for neutron dosimetry, these sensors could be retrieved for readout and replaced as desired.

As described above for the neutron sensors, thermocouples may also be loaded into the container 10 prior to sealing. The voltage generated in the thermocouple junction (several mV) may be coded in an AC or acoustic signal for remote pickup, as described earlier for neutron detection using semiconductor detectors.

It is also advantageous to detect any structural degradation in the container internals before failure actually occurs. This is especially true for a container which is to be transported to a new location. Transport may apply additional stresses to the container internals. Unanticipated failure of cracked components during transportation could lead to changes in the canister internal geometry that could lead to unsafe conditions if the canister were to be reflooded with water. Similarly, it is useful to verify that no damage occurred during transportation.

Figure 10:
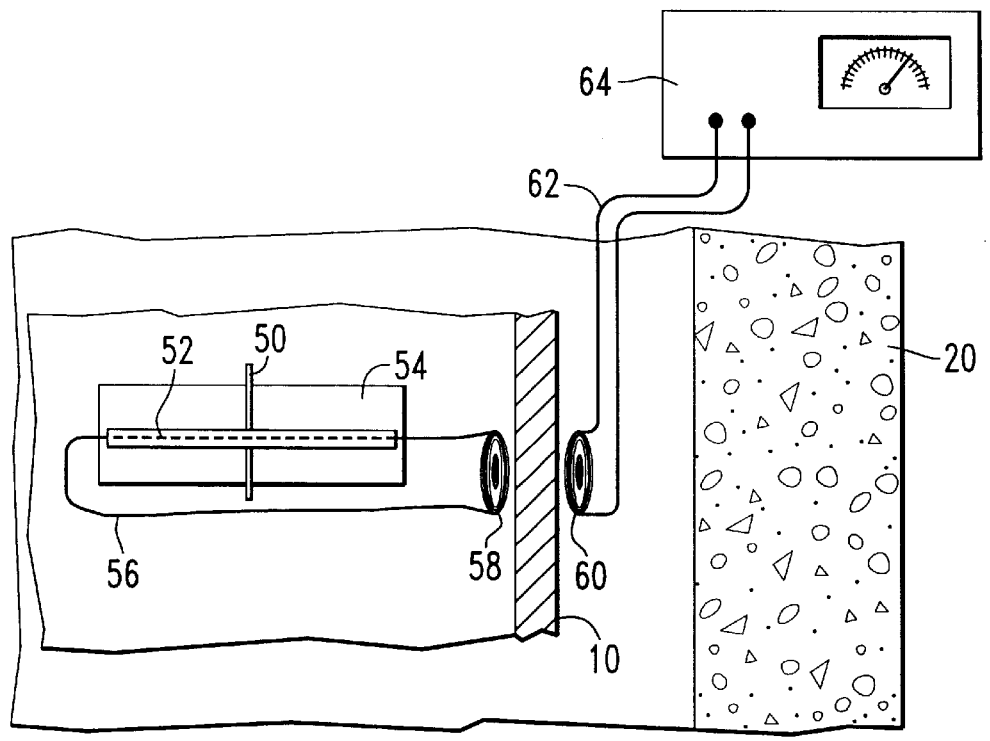
FIGS. 10 and 11 are partially schematic side sectional views of a sensor for structural integrity of selected joints or components in accordance with another embodiment of the present invention.
Figure 11:
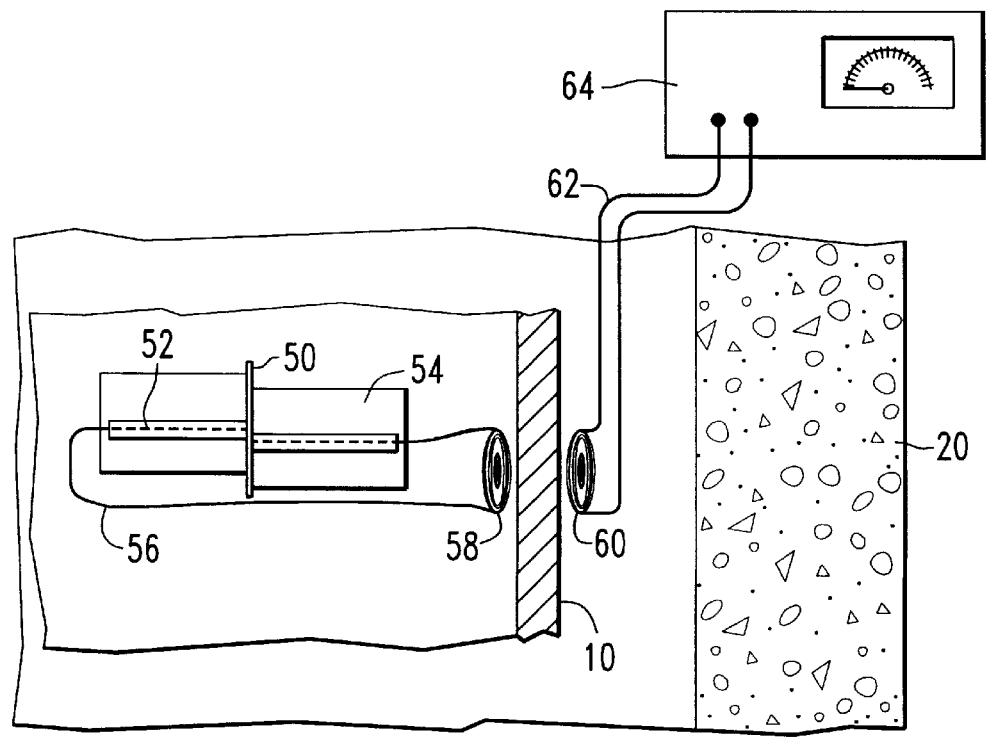

In accordance with an embodiment of the present invention, schematic drawings of an incipient structural failure detection circuit are shown in FIGS. 10 and 11. A selected area or internal joint or component of the container 10 may be monitored for structural cracks or failures. For example, a critical joint 50 of the container 10 may be monitored by running a wire 52 and conductive tape 54 across the joint 50. The wire 52 and tape 54 are electrically connected by a wire 56 to an internal coil 58. An external coil 60 located outside the container 10 is inductively coupled to the internal coil 58. Wires 62 extend from the external coil 60 to an inductance meter 64 located outside of the cask 20.

As shown in FIG. 10, when the critical joint 50 of the container 10 is intact, an uninterrupted circuit is provided through the internal coil 58. However, as shown in FIG. 11, when the critical joint 50 develops a crack or fails, the wire 52 is broken, thereby interrupting the inductive loop in the internal coil 58. This interruption is picked up by the external coil 60 and fed to the inductance meter 64.

Detection of incipient structural failures can thus be accomplished in a manner similar to that described for internal neutron and γ-ray detection. In this embodiment, the external coil 60 is coupled to the internal coil 58 which is part of a simple electrical network. This network preferably uses the continuity of the conductive wire 52 and tape 54 to confirm that critical components are in the correct location and are crack free. The tape preferably has a high conductivity, and is bonded to the monitored surface 10 using a ceramic adhesive with high dielectric strength, bond strength, radiation resistance and thermal stability. A magnesia based adhesive such as commercially available AREMCO Cermabond 571 and aluminum metal tape are a preferred embodiment. If a crack develops in a critical component, or if there is displacement across a critical joint 50, the wire 52 and tape 54 are severed and the continuity of the coil circuit is destroyed. This is observed as a drop is the low frequency inductance of the external probe coil.

While certain embodiments of the present invention have been described, various changes, modifications, additions and adaptations may be made without departing from the scope of the invention, as set forth in the following claims.

What is claimed is:

1. A system for monitoring the integrity of contained spent nuclear fuel comprising:
   a sealed container;
   spent nuclear fuel in the container;
   at least one neutron and γ-ray detector positioned to receive neutron flux and γ-ray flux from the spent nuclear fuel;
   means for monitoring the integrity of the contained spent nuclear fuel based upon the detected neutron flux and γ-ray flux; and
   at least one structural sensor for detecting the structural integrity of components within the container.

2. The system of claim 1, wherein the container is sealed by welding.

3. The system of claim 1, wherein the container is generally cylindrical.

4. The system of claim 1, wherein the spent nuclear fuel comprises at least one spent nuclear fuel assembly.

5. The system of claim 1, wherein the at least one neutron detector is positioned outside the container.

6. The system of claim 1, wherein the spent nuclear fuel comprises a plurality of spent nuclear fuel assemblies.

7. The system of claim 6, further comprising a neutron absorbing material inside the container between the spent nuclear fuel assemblies.

8. The system of claim 1, wherein the at least one neutron and γ-ray detector is positioned inside the container and the system includes means for transmitting signals generated by the neutron and γ-ray detector from inside the container to outside the container.

9. The system of claim 8, wherein the means for transmitting signals from inside the container to outside the container comprises an RLC circuit including the detector as a component providing a varying current and resistance and an external pick-up loop tuned to a resonant frequency of RCL circuit.

10. The system of claim 1, wherein the structural sensor comprises an interruptable circuit including a loop with an internal coil inside the container and an external coil outside the container for generating a reduced signal when the loop is interrupted.

11. The system of claim 1, wherein the at least one neutron detector comprises a semiconductor active region.

12. The system of claim 11, wherein the semiconductor active region comprises at least one material selected from the group consisting of SiC, Si, Ge, diamond, GaAs, GaP, PbO, $PbBr_2$, $PbI_2$, CdS, CdTe and CdZnTe.

13. The system of claim 11, wherein the semiconductor active region comprises SiC.

14. The system of claim 1, further comprising at least one temperature sensor positioned adjacent the container.

15. The system of claim 14, further comprising a plurality of the temperature sensors located outside the container.

16. The system of claim 15, wherein the spent nuclear fuel comprises at least one spent nuclear fuel assembly having an axial length and the plurality of temperature sensors extend in a substantially linear array along substantially the entire axial length of the spent nuclear fuel assembly.

17. The system of claim 1, further comprising a plurality of the neutron and γ-ray detectors.

18. The system of claim 17, wherein the neutron detectors are positioned in a substantially linear array.

19. The system of claim 18, wherein the spent nuclear fuel comprises at least one spent nuclear fuel assembly having an axial length and the substantially linear array of neutron detectors extends along substantially the entire axial length of the spent nuclear fuel assembly.

20. The system of claim 19, wherein the spent nuclear fuel comprises a plurality of the spent nuclear fuel assemblies, a neutron absorbing material is disposed inside the container between the spent nuclear fuel assemblies along the axial length thereof, and the array of neutron detectors includes means for detecting a removal of the neutron absorbing material along at least a portion of the axial length of the spent nuclear fuel assemblies.

* * * * *